(12) United States Patent  
Kondoh

(10) Patent No.: US 8,576,194 B2  
(45) Date of Patent: Nov. 5, 2013

(54) COORDINATE DETECTING DEVICE

(75) Inventor: Koichi Kondoh, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 508 days.

(21) Appl. No.: 12/422,323

(22) Filed: Apr. 13, 2009

(65) Prior Publication Data

US 2009/0283339 A1   Nov. 19, 2009

(30) Foreign Application Priority Data

May 15, 2008   (JP) ................. 2008-128141

(51) Int. Cl.  
*G06F 3/045* (2006.01)  
*G06F 3/041* (2006.01)

(52) U.S. Cl.  
USPC .......................................... 345/174; 345/173

(58) Field of Classification Search  
USPC ......................................... 345/174; 178/18.05  
See application file for complete search history.

(56) References Cited

U.S. PATENT DOCUMENTS

| 4,731,508 | A | * | 3/1988 | Gibson et al. ............... 178/18.05 |
| 6,163,313 | A | * | 12/2000 | Aroyan et al. ................. 345/173 |
| 2001/0036504 | A1 | | 11/2001 | Bottari et al. |
| 2007/0013678 | A1 | * | 1/2007 | Nakajima et al. ............. 345/174 |

FOREIGN PATENT DOCUMENTS

| JP | 63-024410 | | 2/1988 |
| JP | 8-063274 | | 3/1996 |
| JP | 10-83251 | A | 3/1998 |
| JP | 2001-125724 | A | 5/2001 |
| JP | 2007-25904 | A | 2/2007 |
| JP | 2007-517309 | | 6/2007 |
| KR | 10-2002-0091297 | | 12/2002 |
| KR | 10-0573931 | | 4/2006 |

OTHER PUBLICATIONS

Office Action dated Jan. 7, 2011 issued with respect to the corresponding Korean Patent Application No. 10-2009-0040468.

* cited by examiner

*Primary Examiner* — Alexander Eisen  
*Assistant Examiner* — Mark Regn  
(74) *Attorney, Agent, or Firm* — IPUSA, PLLC

(57) ABSTRACT

A coordinate detecting device includes a resistive film formed over a substrate; and a common electrode formed over the resistive film for applying a voltage to the resistive film. The coordinate detecting device generates potential distribution in the resistive film by applying the voltage to the resistive film from the common electrode and detects a coordinate of a contact position of the resistive film by detecting a potential of the contact position of the resistive film. The substrate is formed of an insulator in a square shape. The common electrode is formed along an edge part of the substrate. The resistive film under the common electrode has one or more areas where the resistive film does not exist. An L-shaped resistive film absent area where the resistive film does not exist is provided in one or more corners of the substrate and on the same side of the common electrode as a side where a center of the substrate is situated.

11 Claims, 14 Drawing Sheets

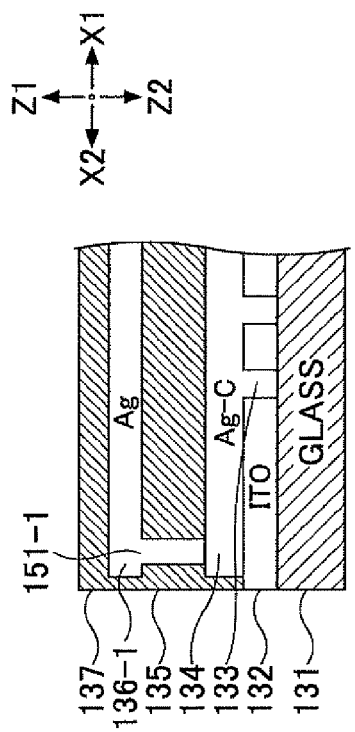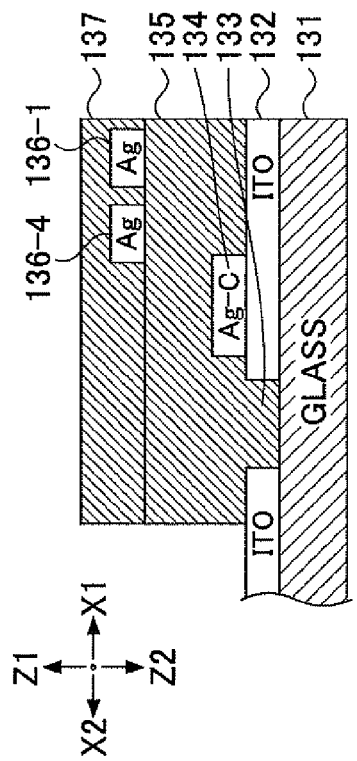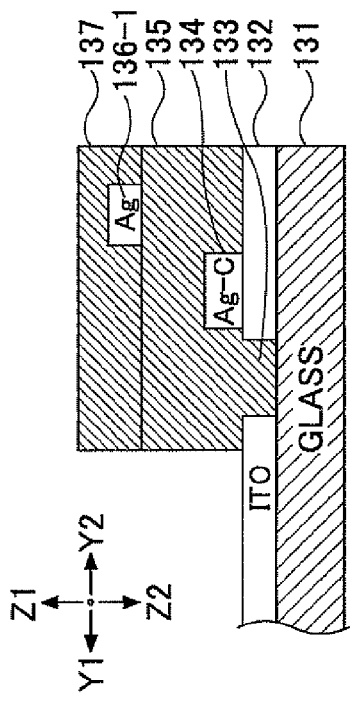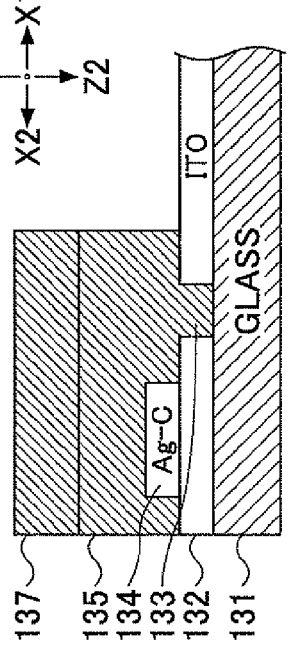

P1>P2>P3>P4

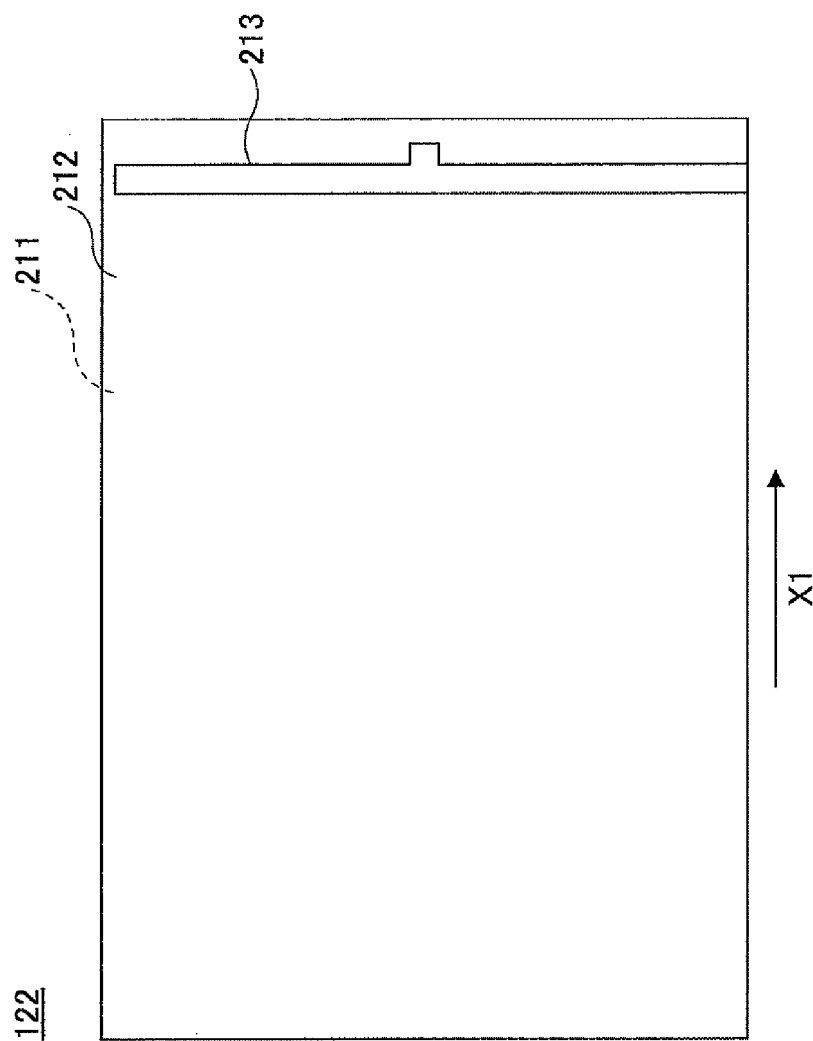
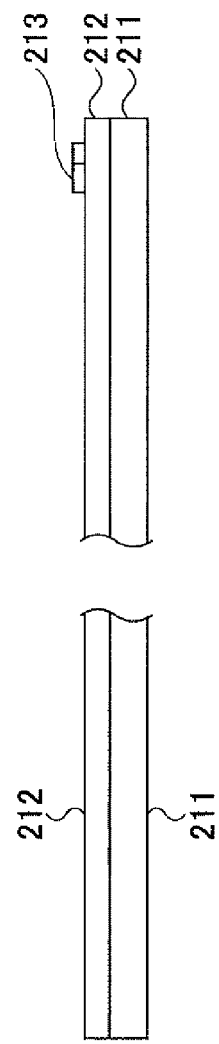
FIG.5A
FIG.5B

COORDINATE DETECTING DEVICE

BACKGROUND OF THE INVENTION

1. Field of the Invention

The present invention relates to a coordinate detecting device.

2. Description of the Related Art

Touch panels have been used, for example, as input devices for computer systems. A touch panel mounted on a display can detect coordinate positions on the display and obtain detection signals corresponding to the coordinate positions. Touch panels allow direct, easy, and intuitive input of data.

There have been suggested various types of touch panels such as resistive type, optical type, and capacity coupling type touch panels. The resistive touch panels having a simple structure and control system are predominantly used. As resistive touch panels, there are a four-wire type, a five-wire type, an eight-wire type touch panels, and the like depending on an arrangement of electrodes over a resistive film.

Among these, in the five-wire type touch panel, a conductive film of a top substrate provided on an operations surface side is simply used only for reading potentials, which is different from the four-wire type and eight-wire type resistive touch panels. Thus, the five-wire type touch panel does not have a problem of edge sliding, which is a defect of the four-wire type and eight-wire type touch panels. Therefore, the five-wire type touch panels have been used in markets that demand durability in a severe usage environment or over a long time.

FIG. 12 is a configuration diagram of a five-wire type resistive touch panel. A five-wire type resistive touch panel 1 is formed of a top substrate 11 and a bottom substrate 12. As the bottom substrate 12, a transparent resistive film 22 is formed all over a surface of a glass substrate 21. Over the transparent resistive film 22, X-axis coordinate detecting electrodes 23 and 24, and Y-axis coordinate detecting electrodes 25 and 26 are formed. As the top substrate 11, a transparent resistive film 32 is formed over a film substrate 31. A coordinate detecting electrode 33 is formed over the transparent resistive film 32.

First, by applying a voltage to the X-axis coordinate detecting electrodes 23 and 24, a potential distribution is generated in a direction of the X-axis of the transparent resistive film 22 of the bottom substrate 12. At this time, by detecting a potential of the transparent resistive film 22 of the bottom substrate 12, an X-coordinate of a contact position of the bottom substrate 12 with the top substrate 11 can be detected. Next, by applying a voltage to the Y-axis coordinate detecting electrodes 25 and 26, a potential distribution is generated in a direction of the Y-axis in the transparent resistive film 22 of the bottom substrate 12. At this time, by detecting a potential of the transparent resistive film 22 of the bottom substrate 12, a Y-coordinate of a contact position of the bottom substrate 12 with the top substrate 11 can be detected.

In this case, in such a type of touch panel, there is a problem in how to generate an even potential distribution in the transparent resistive film 22 of the bottom substrate 12. To generate the even potential distribution in the transparent resistive film 22 of the bottom substrate 12, a method to provide plural stages of potential distribution correction patterns in a periphery is disclosed in Patent Document 1.

Further, Patent Document 2 discloses a method to provide a common electrode so as to surround a periphery of an input surface. Patent Document 3 discloses a method to form an opening in an insulating film provided over a transparent resistive film and to apply a potential through the opening.

Patent Document 1: Japanese Patent Application Publication No. 10-83251
Patent Document 2: Japanese Patent Application Publication No. 2001-125724
Patent Document 3: Japanese Patent Application Publication No. 2007-25904

Coordinate input devices are required to be narrower in frame size in response to the downsizing and the like of devices to which the coordinate input devices are mounted. However, it has been difficult to form the coordinate input device disclosed in Patent Document 1 with a narrower frame since it is necessary to provide plural stages of potential distribution patterns in a periphery.

Moreover, by the method to provide a common electrode to surround a periphery of an input surface as disclosed in Patent Document 2, there has been a problem in that the potential distribution of a transparent resistive film becomes uneven unless a resistance ratio between the transparent resistive film and a pattern resistance is increased.

Furthermore, although the aforementioned two problems can be solved by the method to provide an opening in a formed insulating film as disclosed in Patent Document 3, a manufacturing process becomes complicated in this case. In particular, there have been some cases that variations of materials and resistance values caused in the manufacturing process become a factor to decrease a yield of a desired product property.

SUMMARY OF THE INVENTION

The present invention is made in light of the above circumstances and may provide a coordinate detecting device capable of being formed with a narrower frame and improving a detection precision of coordinate positions.

According to an aspect of the present invention, a coordinate detecting device includes a resistive film formed over a substrate; and a common electrode formed over the resistive film for applying a voltage to the resistive film. The coordinate detecting device is configured to generate a potential distribution in the resistive film by applying the voltage to the resistive film from the common electrode and configured to detect a coordinate of a contact position of the resistive film by detecting a potential of the contact position of the resistive film. The substrate is formed of an insulator in a square shape. The common electrode is formed along an edge part of the substrate. The resistive film under the common electrode has one or more resistive film absent areas where the resistive film does not exist. An L-shaped resistive film absent area where the resistive film does not exist is provided in one or more corners of the square shape of the substrate and on the same side of the common electrode as a side where a center of the substrate is situated.

According to another aspect of the present invention, a coordinate detecting device includes a resistive film formed over a substrate; and a common electrode formed over the resistive film for applying a voltage to the resistive film. The coordinate detecting device is configured to generate a potential distribution in the resistive film by applying the voltage to the resistive film from the common electrode and configured to detect a coordinate of a contact position of the resistive film by detecting a potential of the contact position of the resistive film. The substrate is formed of an insulator in a square shape. The common electrode is formed along an edge part of the substrate. A first resistive film absent area where the resistive film does not exist is provided adjacent to the common electrode and on the same side of the common electrode as a side where a center of the substrate is situated. A space between adjacent sides of the common electrode and the first resistive film absent area is 0 mm to 5 mm. An L-shaped second resistive film absent area is provided in one or more corners of the square shape of the substrate and on the same side of the common electrode as the side where the center of the substrate is situated.

BRIEF DESCRIPTION OF THE DRAWINGS

FIGS. 2A to 2E are configuration diagrams of a panel unit 111;

FIGS. 5A and 5B are configuration diagrams of a top substrate 122;

DETAILED DESCRIPTION OF THE PREFERRED EMBODIMENTS

Next, preferred embodiments of the present invention are described below.

[First Embodiment]

A first embodiment of the present invention is described. This embodiment relates to a coordinate detecting device.

(System Configuration)

Figure 1:
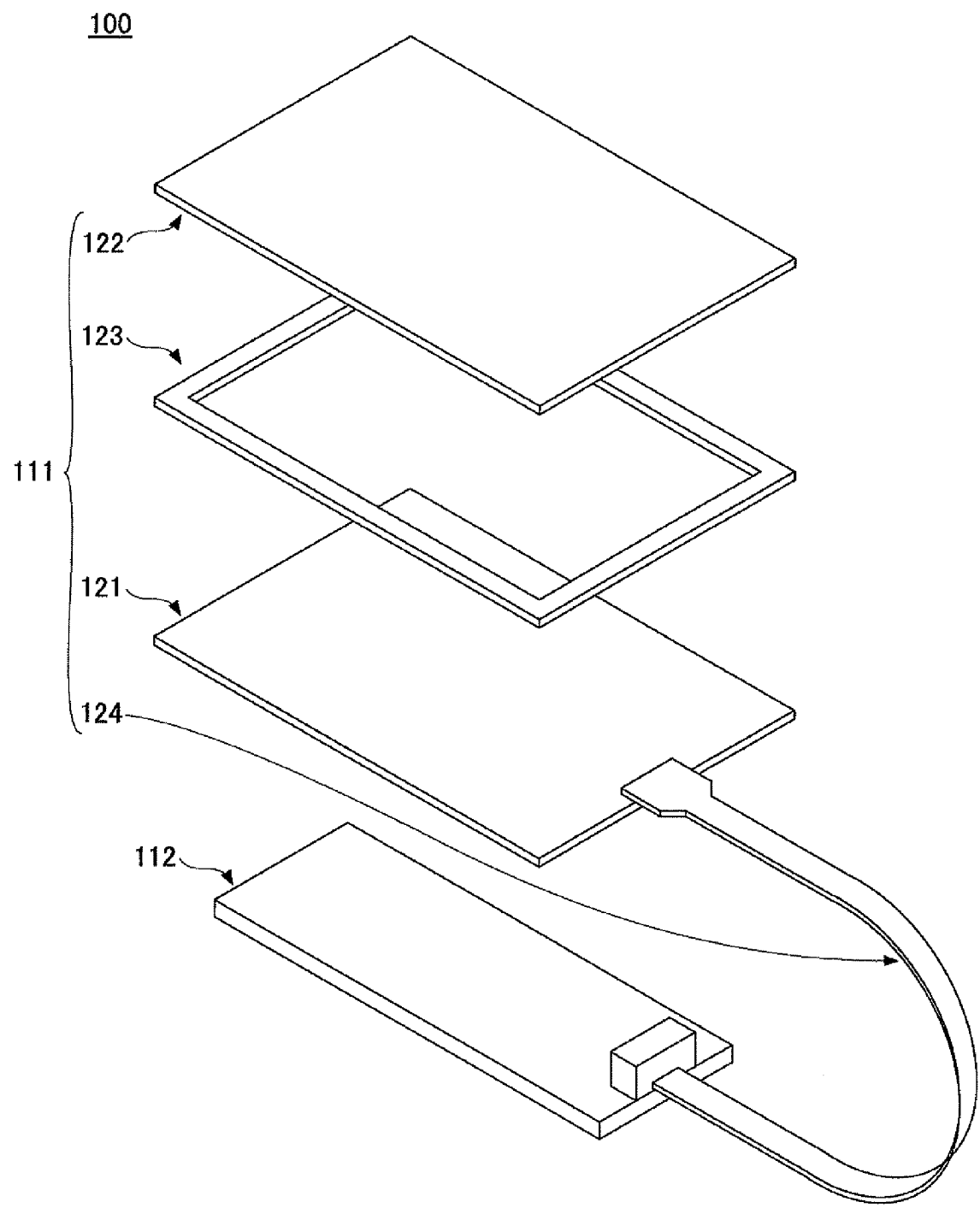
FIG. 1 is a system configuration diagram of a coordinate detecting device.

FIG. 1 shows a system configuration of the coordinate detecting device of this embodiment. In this embodiment, what is called a five-wire type analog resistive touch panel is described as a coordinate input system 100. The coordinate input system 100 of this embodiment is formed of a panel unit 111 and an interface board 112.

The panel unit 111 includes a bottom substrate 121, a top substrate 122, a spacer 123, and an FPC cable 124. The bottom substrate 121 and the top substrate 122 are adhered together with the spacer 123 interposed therebetween. The spacer 123 formed of an insulating double-sided tape and the like adheres the bottom substrate 121 and the top substrate 122 while providing a predetermined space between the bottom substrate 121 and the top substrate 122. Further, the FPC cable 124 is formed of first to fifth wires formed over a flexible printed substrate. The FPC cable 124 is connected to the bottom substrate 121 by, for example, bonding an anisotropic conductive film and the like by thermal compression.

(Bottom Substrate 121)

Figure 2A:
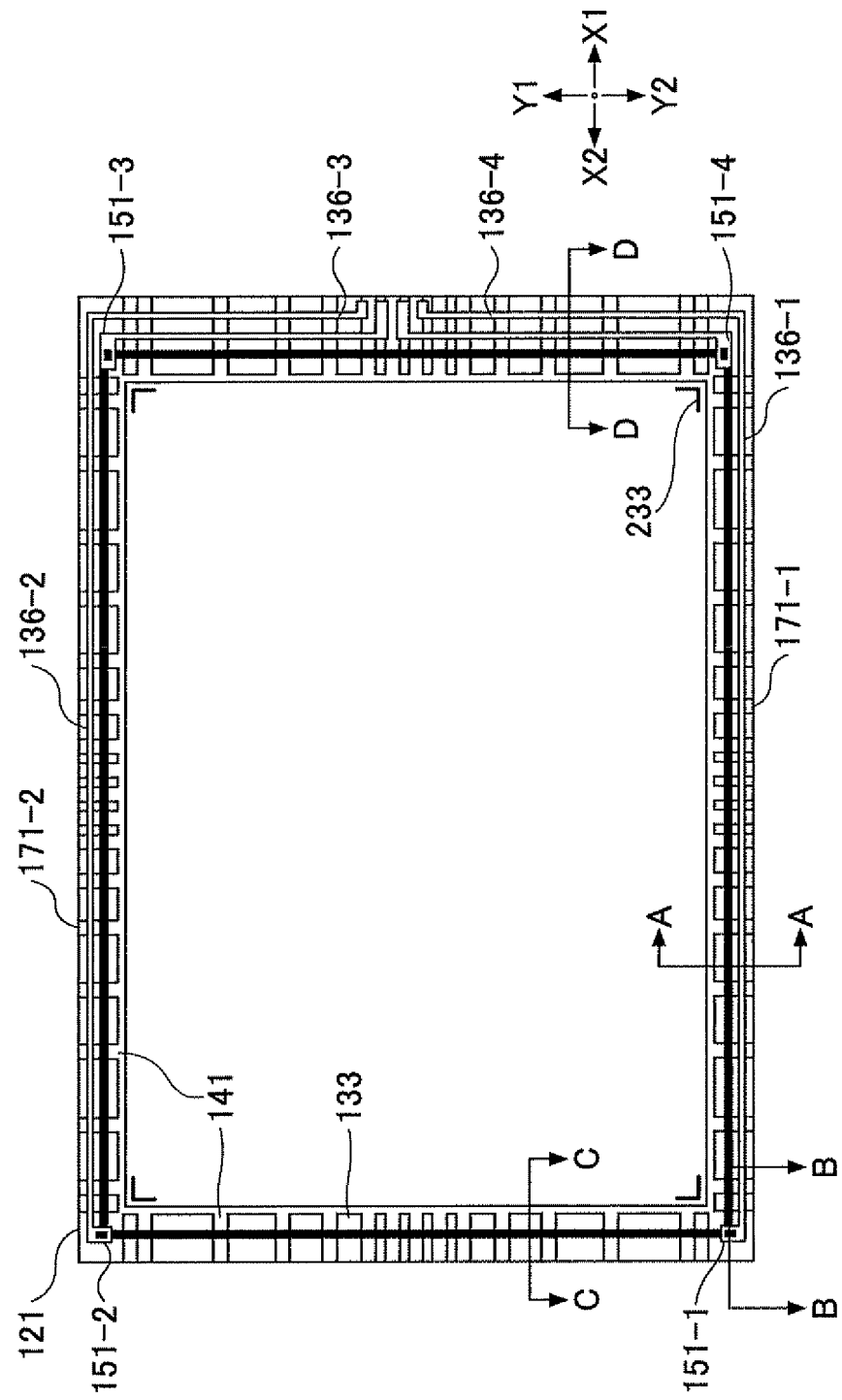

Next, a configuration of the bottom substrate 121 is described with reference to FIGS. 2A to 2E. FIG. 2A is a plan view of the bottom substrate 121, FIG. 2B is a cross-sectional view taken along a line A-A in FIG. 2A, FIG. 2C is a cross-sectional view taken along a line B-B in FIG. 2A, FIG. 2D is a cross-sectional view taken along a line C-C in FIG. 2A, and FIG. 2E is a cross-sectional view taken along a line D-D in FIG. 2A.

The bottom substrate 121 is formed of a glass substrate 131, a transparent resistive film 132, a resistive film absent area 133, a common electrode 134, a first insulating film 135, wires 136, and a second insulating film 137. The transparent resistive film 132 is formed over an almost whole surface of the glass substrate 131. The transparent resistive film 132 is formed of, for example, ITO (Indium Tin Oxide) by a method such as vacuum vapor deposition. The transparent resistive film 132 transmits light in a visible region of the spectrum and has a predetermined resistance. Note that all of the transparent resistive film 132 is not removed in the resistive film absent area 133. By removing the transparent resistive film 132 of an edge part of the resistive film absent area 133, the transparent resistive film 132 remaining in the resistive film absent area 133 and the transparent resistive film 132 outside the resistive film absent area 133 are electrically insulated. In this manner, by insulating the transparent resistive film 132 in the resistive film absent area 133 and the transparent resistive film 132 outside the resistive film absent area 133, a similar effect to the case of removing all of the transparent resistive film 132 in the resistive film absent area 133 can be obtained. As a result, a throughput can be improved since there is less transparent resistive film 132 to be removed. Note that only the transparent resistive film 132 in the edge part of the resistive film absent area 133 is removed in FIG. 2A. Since a voltage is applied from the common electrode 134 outside the resistive film absent area 133, the transparent resistive film 132 inside the edge part of the resistive film absent area 133 does not have an influence on voltage distribution.

(Resistive Film Absent Area 133)

Figure 3A:
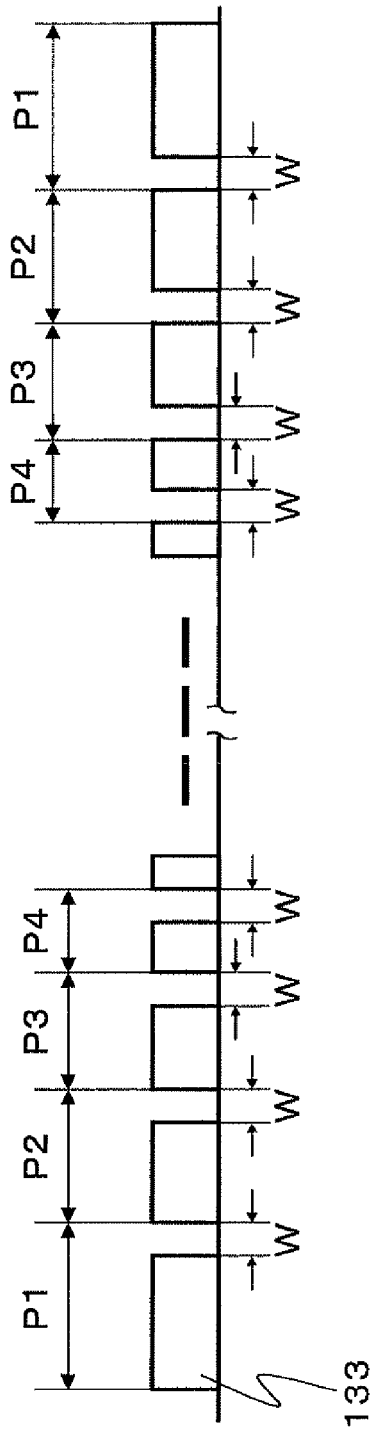
FIGS. 3A and 3B are plan views each showing a substantial part of a first resistive film absent area 133.

The resistive film absent area 133 serving as a first resistive film absent area is provided in a peripheral edge part of the glass substrate 131 and in an area where the common electrode 134 is formed. Specifically, the common electrode 134 is formed over the transparent resistive film 132 in which the resistive film absent area 133 is formed. As a result, the common electrode 134 and the transparent resistive film 132 between the adjacent resistive film absent areas 133 are connected to form a potential apply area. In this embodiment, as shown in FIG. 3A, spaces W between the mutually adjacent resistive film absent areas 133, that is, widths of the potential apply areas formed between the adjacent resistive film absent areas 133 are formed having the same widths as described below. In peripheries of opposite ends of a first side 171-1, a second side 171-2, a third side 171-3, and a fourth side 171-4 of the panel unit 121, the resistive film absent areas 133 are formed with wide pitches, and the pitches narrow toward a central part of each side. Specifically, pitches P1, P2, P3, P4, . . . of the resistive film absent areas 133 are formed to be in a relationship of P1>P2>P3>P4 . . . from the opposite ends toward the central part.

(L-Shaped Resistive Film Absent Area 233)

An L-shaped resistive film absent area 233 serving as a second resistive film absent area is formed in an L-shape at four corners of a square formed by four sides of the common electrodes 134 and inside the resistive film absent area 133, that is, on the same side of the resistive film absent area 133 as a side where a center of the substrate is situated. A reason for forming the L-shaped resistive film absent area 233 is briefly described below with reference to FIG. 4.

When the L-shaped resistive film absent area 233 is not formed, only the resistive film absent area 133 is formed. In this case, the potential distribution easily becomes uneven at the four corners of the square formed by the four sides of the common electrodes 134.

Figure 4A:
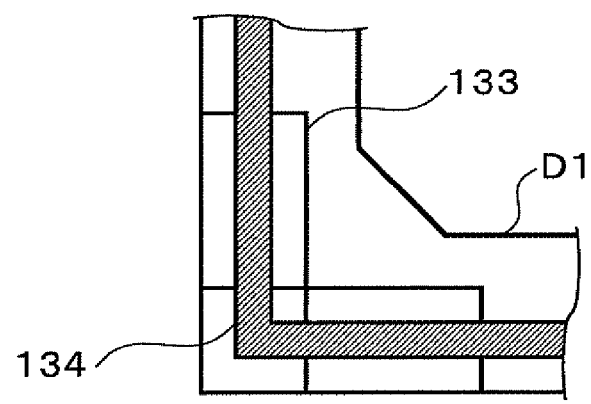
FIGS. 4A to 4C are diagrams each showing an L-shaped resistive film absent area (second resistive film absent area) 233.

When the resistive film absent areas 133 contact each other at the four corners as shown in FIG. 4A, no potential is applied from the common electrode 134 at the four corners. Therefore, the potential distribution becomes as shown by a line D1, which is uneven potential distribution in a rounded shape without corners.

Figure 4B:
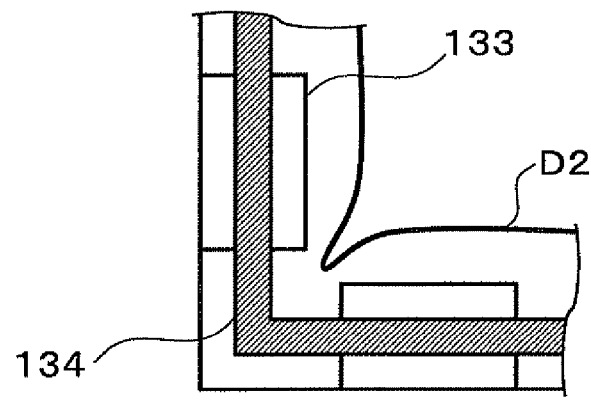

Further, when the resistive film absent areas 133 are apart from each other at the four corners as shown in FIG. 4B, a potential is applied from the common electrode 134 at the four corners. Therefore, the potential distribution becomes as shown by a line D2, which is uneven potential distribution in a shape extending to the four corners.

Figure 4C:
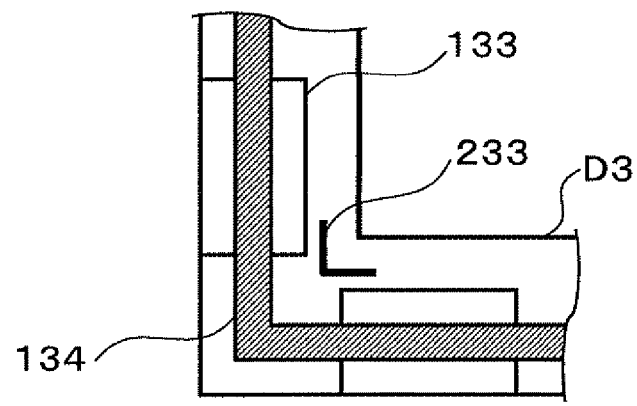

In this embodiment, as shown in FIG. 4C, the resistive film absent areas 133 are formed apart from each other at the four corners and the resistive film 132 provided inside the resistive film absent areas 133, that is on the same side of the resistive film absent area 133 as a side where the center of the substrate is situated, is removed in an L-shape to form the L-shaped resistive film absent area 233. As a result, the potential distribution becomes as shown by a line D3, which is an almost ideal even potential distribution with the remaining four corners.

The L-shaped resistive film absent area 233 as described above is formed in the bottom substrate 121 of the coordinate detecting device of this embodiment. Note that this L-shaped resistive film absent area 233 is formed at the same time as the resistive film absent areas 133. Therefore, almost no additional load is generated in the manufacturing process.

(Potential Apply Area)

A potential apply area is formed in a contact area of the common electrode 134 and the transparent resistive film 132 between the adjacent resistive film absent areas 133. In this embodiment, when specifically described with reference to FIG. 3B, the potential apply areas are formed with wide pitches in the peripheries of the opposite ends of the first side 171-1, the second side 171-2, the third side 171-3, and the fourth side 171-4 of the panel unit 121, and the pitches narrow toward a central part of each side. With such a configuration, distortion of the potential distribution caused at the first side 171-1, the second side 171-2, the third side 171-3, and the fourth side 171-4, where the potential distribution tends to be largely distorted inwardly, can be reduced. Moreover, the potential distribution in the transparent resistive film 132 can be made even. Consequently, coordinate positions can be correctly detected.

Figure 3B:
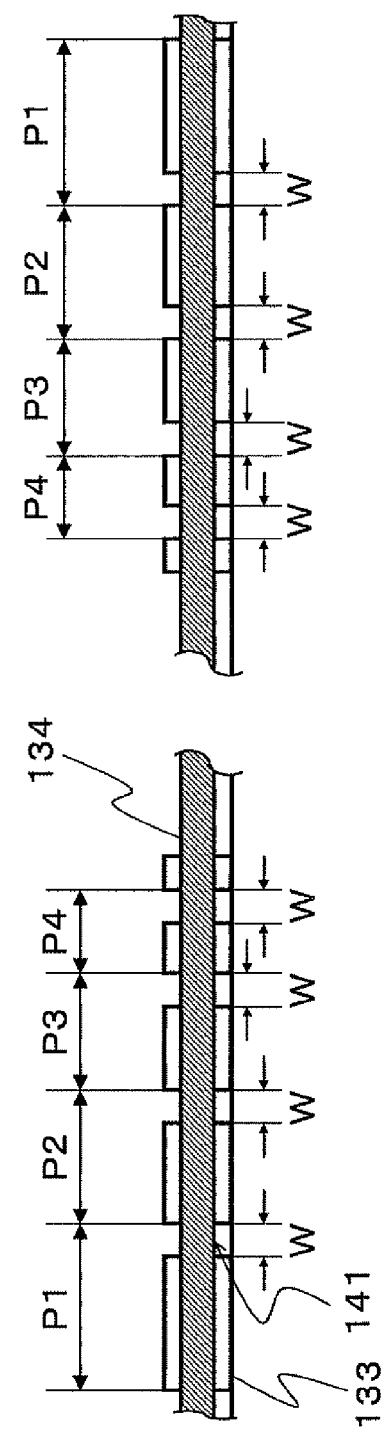

Note that a shape of the potential apply area is not limited to the shape shown in FIG. 3B. By removing a part of the transparent resistive film 132, areas where the transparent resistive film 132 and the common electrode 134 contact may be formed with pitches that are narrower toward the opposite ends of the first side 171-1, the second side 171-2, the third side 171-3, and the fourth side 171-4 of the panel unit 121, and with pitches widening toward the central part.

(Common Electrode 134)

The common electrode 134 is formed of, for example, Ag—C over the resistive film absent area 133 and the transparent resistive film 132 between the resistive film absent areas 133.

(First Insulating Film 135)

A first insulating film 135 is stacked over the resistive film absent area 133 to cover the common electrode 134. In the first insulating film 135, first to fourth through-holes 151-1 to 151-4 are formed at four corners of the bottom substrate 121. The first to fourth through-holes 151-1 to 151-4 form a driving voltage applying part.

(First to Fourth Wires 136-1 to 136-4)

A first wire 136-1 is formed of, for example, a low resistant material such as Ag. The first wire 136-1 is formed along the first side 171-1 of the bottom substrate 121 over the first insulating film 135. In this case, the first wire 136-1 is formed so as to fill the first through-hole 151-1 formed in the first insulating film 135. Further, the first wire 136-1 is connected to a first wire of the FPC cable 124.

A second wire 136-2 is formed of, for example, a low resistant material such as Ag. The second wire 136-2 is formed along the second side 171-2 opposing the first side 171-1 of the bottom substrate 121 over the first insulating film 135. In this case, the second wire 136-2 is formed to fill the second through-hole 151-2 formed in the first insulating film 135. The second wire 136-2 is connected to a second wire of the FPC cable 124.

A third wire 136-3 is formed of, for example, a low resistant material such as Ag. The third wire 136-3 is formed along a half of the third side 171-3 on a side of the second side 171-2 over the first insulating film 135. The third side 171-3 vertically crosses the first side 171-1 and the second side 171-2 of the bottom substrate 121. The third wire 136-3 is formed to fill the third through-hole 151-3 formed in the first insulating film 135. Further, the third wire 136-3 is connected to a third wire of the FPC cable 124.

A fourth wire 136-4 is formed of, for example, a low resistant material such as Ag. The fourth wire 136-4 is formed along a half of the third side 171-3 on a side of the first side 171-1 over the first insulating film 135. The third side 171-3 vertically crosses the first side 171-1 and the second side 171-2 of the bottom substrate 121. The fourth wire 136-4 is formed so as to fill the third through-hole 151-3 formed in the first insulating film 135. Further, the fourth wire 136-4 is connected to a fourth wire of the FPC cable 124.

A second insulating film 137 is formed over the first insulating film 135 to cover the first wire 136-1, the second wire 136-2, the third wire 136-3, and the fourth wire 136-4. Further, the top substrate 122 is adhered onto the second insulating film 137 with the spacer 123 interposed therebetween.

(Top Substrate 122)

Subsequently, a configuration of the top substrate 122 is described with reference to FIGS. 5A and 5B. FIG. 5A is a top view of the top substrate 122 and FIG. 5B is a cross sectional view of the top substrate 122. The top substrate 122 includes a film substrate 211, a transparent resistive film 212, and an electrode 213. The film substrate 211 is formed of, for example, a flexible resin film such as PET(polyethylene terephthalate). Over a whole surface of the film substrate 211 of a side facing the bottom substrate 121, the transparent resistive film 212 is formed. The transparent resistive film 212 is formed of a transparent conductive material such as ITO. The electrode 213 is provided over the transparent resistive film 212 of the top substrate 122 at an end part in an X1 direction. The electrode 213 is connected through a contact which is not shown to a fifth wire of the FPC cable 124 connected to the bottom substrate 121. By detecting a potential of the bottom substrate 121 by the interface board 112 by using the top substrate 122 as a probe, coordinate positions are detected.

(Detection Order)

Figure 6:
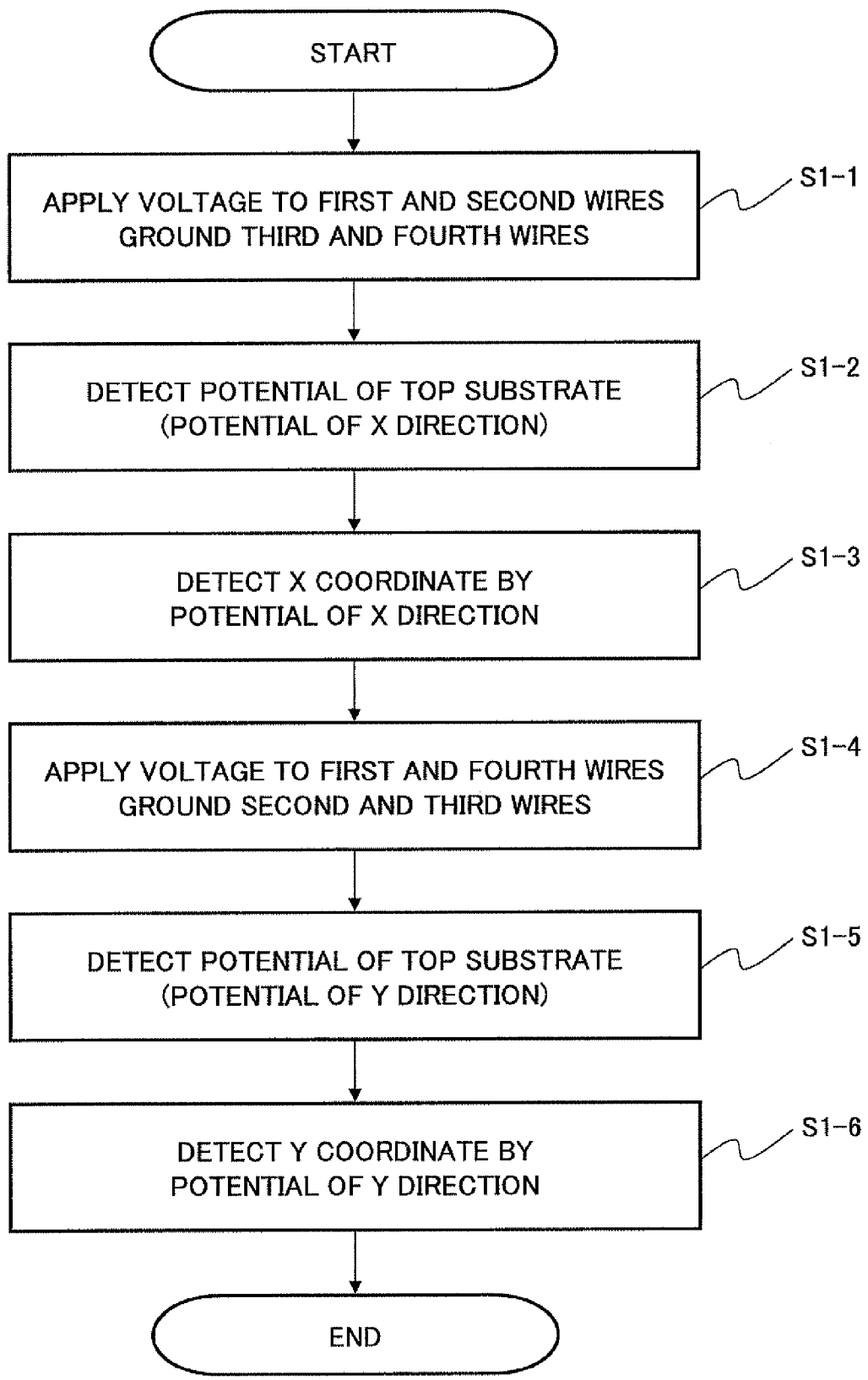
FIG. 6 is a process flowchart of an interface board 112.
Figure 7A:
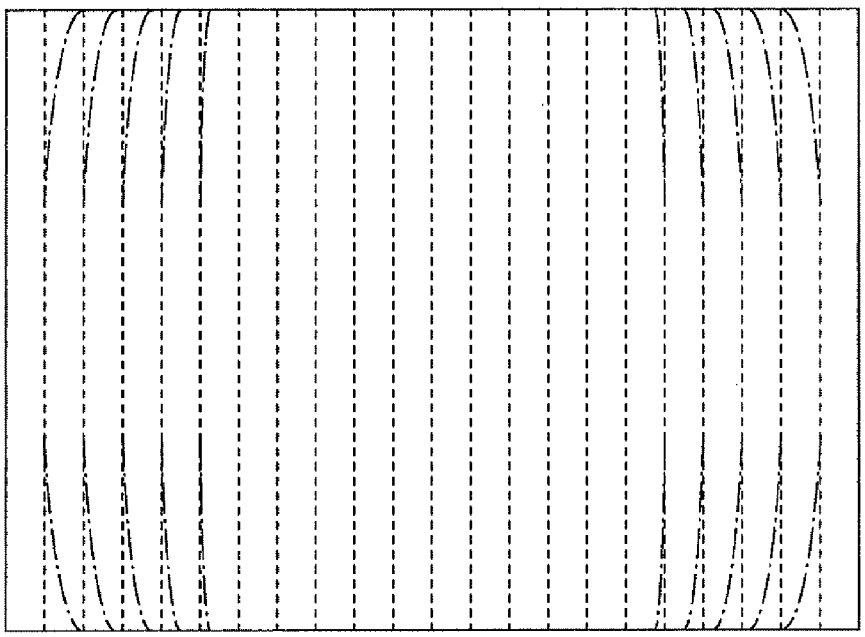
FIGS. 7A and 7B are diagrams each showing a state of potential distribution of a bottom substrate 121.
Figure 7A:
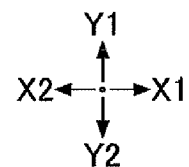
Figure 7B:
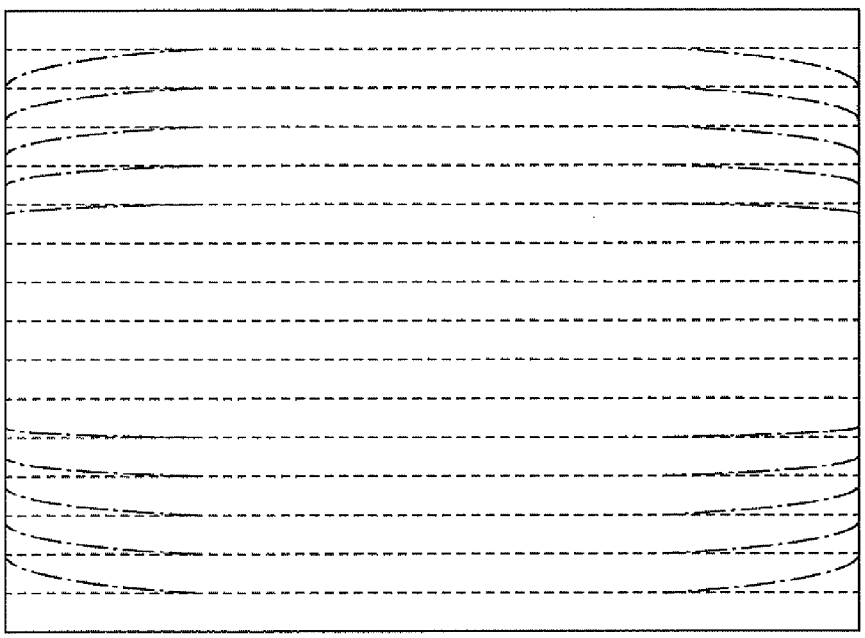
Figure 7B:
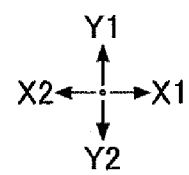

Next, an order to detect coordinate positions in the coordinate detecting device of this embodiment is described. FIG. 6 shows a process flowchart of the interface board 112 and FIGS. 7A and 7B each shows potential distribution of the bottom substrate 121. FIG. 7A shows a potential distribution in detecting an X-coordinate and FIG. 7B shows a potential distribution in detecting a Y-coordinate.

The interface board 112 applies a voltage Vx to the first wire 136-1 and the second wire 136-2 and grounds the third wire 136-3 and the fourth wire 136-4 in step SI-i. As a result, even an electric field distribution as shown by broken lines in FIG. 7A can be generated in the transparent resistive film 132. Note that the conventional potential distribution has been distorted as shown by alternate long and short dash lines shown in FIG. 7A. Therefore, according to this embodiment, an X-coordinate can be correctly detected.

Next, the interface board 112 detects a potential of the bottom substrate 121 in step S1-2, and detects an X-coordinate corresponding to the potential of the bottom substrate 121 in step S1-3.

Subsequently, the interface board 112 applies a voltage Vy to the first wire 136-1 and the fourth wire 136-4, and grounds the second wire 136-2 and the third wire 136-3 in step Sl-4. As a result, even the electric field distribution as shown by broken lines in FIG. 7B can be generated in the transparent resistive film 132. Note that the conventional potential distribution has been distorted as shown by alternate long and short dash lines shown in FIG. 7B. Therefore, according to this embodiment, a Y-coordinate can be correctly detected.

Next, the interface board 112 detects a potential of the bottom substrate 121 in step S1-5 and detects a Y-coordinate corresponding to the potential of the bottom substrate 121 in step S1-6.

According to this embodiment, since the wires 136-1 to 136-4 are stacked over the common electrode 134, the panel unit 121 can be formed with a narrower frame. Moreover, a potential applied by the potential apply area to the transparent resistive film 132 of the bottom substrate 121 when detecting an X-axis coordinate or a Y-axis coordinate can be evenly distributed in a detection area. Therefore, coordinates can be correctly detected.

(Manufacturing Method)

Next, a manufacturing method of a coordinate detecting device according to this embodiment is described. Specifically, this embodiment relates to a manufacturing method of the bottom substrate 121. This embodiment is described with reference to FIGS. 8A to 8F.

Figure 8A:
FIGS. 8A to 8F are diagrams showing manufacturing steps of the bottom substrate 121.

First, the transparent resistive film 132 such as ITO is formed over the glass substrate 131 by sputtering, vacuum vapor deposition, or the like as shown in FIG. 8A.

Figure 8B:
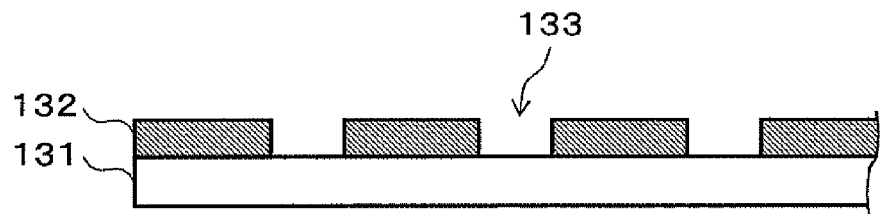

Subsequently, the resistive film absent area 133 and the L-shaped resistive film absent area 233 which is not shown are formed in the transparent resistive film 132 as shown in FIG. 8B. Specifically, by irradiating an area of the transparent resistive film 132 to be removed with an ultraviolet (UV) ray laser light or an infrared laser light, the transparent resistive film 132 in this area is removed by ablation or evaporated by heat. Alternatively, after forming a resist pattern that covers an area other than the resistive film absent area 133 and the L-shaped resistive film absent area 233 of the transparent resistive film 132, the transparent resistive film 132 may be etched by chemical etching using hydrochloric acid or phosphoric acid.

Figure 8C:
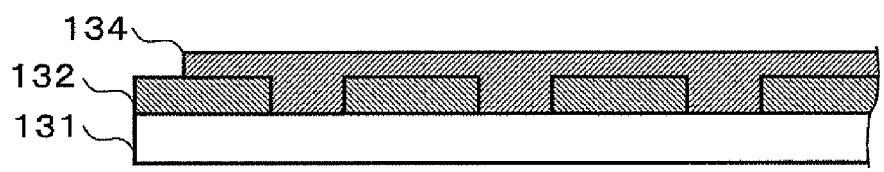

Subsequently, the common electrode 134 formed of Ag-C is formed over the transparent resistive film 132 as shown in FIG. 8C. Specifically, after printing a paste including Ag—C by screen printing, the paste is baked to be formed into the common electrode 134. As a result, a potential apply area is formed over the transparent resistive film 132 between the adjacent resistive film absent areas 133.

Figure 8D:
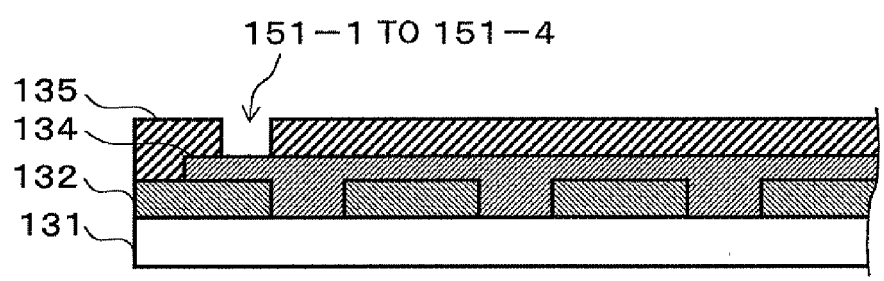

Subsequently, the first insulating film 135 including the first to fourth through-holes 151-1 to 151-4 is formed as shown in FIG. 8D. Specifically, after printing a pattern of an insulating paste by a screen printing method, the insulating paste is baked to be formed into the first insulating film 135.

Figure 8E:
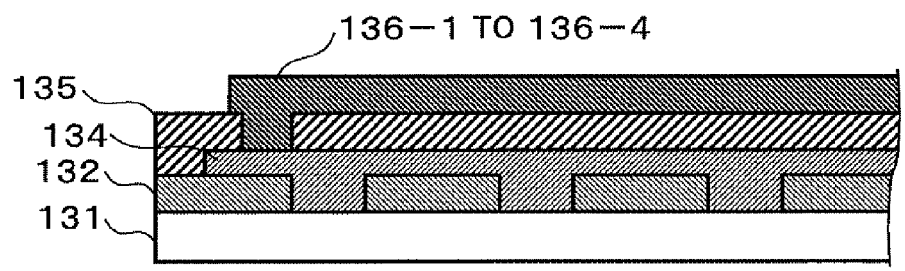

Subsequently, the first to fourth wires 136-1 to 136-4 formed of Ag are formed over the first insulating film 135 as shown in FIG. 8E. Specifically, after printing a pattern of a conductive paste including Ag by a screen printing method, the conductive paste is baked to be formed into the first to fourth wires 136-1 to 136-4.

Figure 8F:
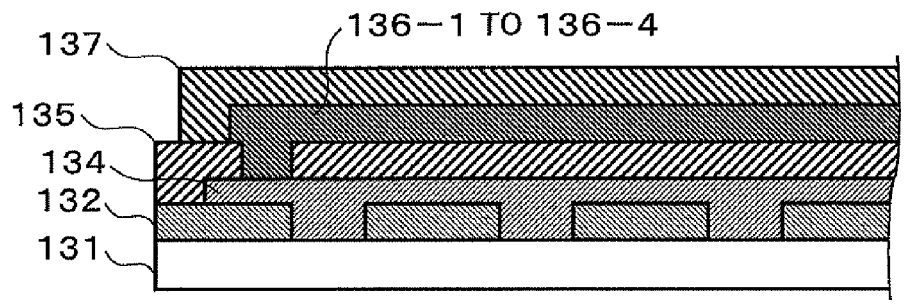

Subsequently, the second insulating film 137 is formed as shown in FIG. 8F. Specifically, after printing a pattern of an insulating paste by a screen printing method, the insulating paste is baked to be formed into the second insulating film 137.

In the manner as described above, the bottom substrate 121 can be manufactured.

Note that a five-wire resistive analog touch panel has been described in this embodiment, however, the present invention is not limited to this and can be applied to other touch panels such as four-wire or seven-wire resistive touch panels.

[Second Embodiment]

Next, a second embodiment of the present invention is described. In this embodiment, a coordinate detecting device is described, in which the resistive film absent area 133 is formed inside the common electrode 134, that is on the same side of the common electrode 134 as a side where the center of the substrate is situated.

The bottom substrate 121 of the coordinate detecting device of this embodiment is described below.

(Bottom Substrate 121)

Figure 9A:
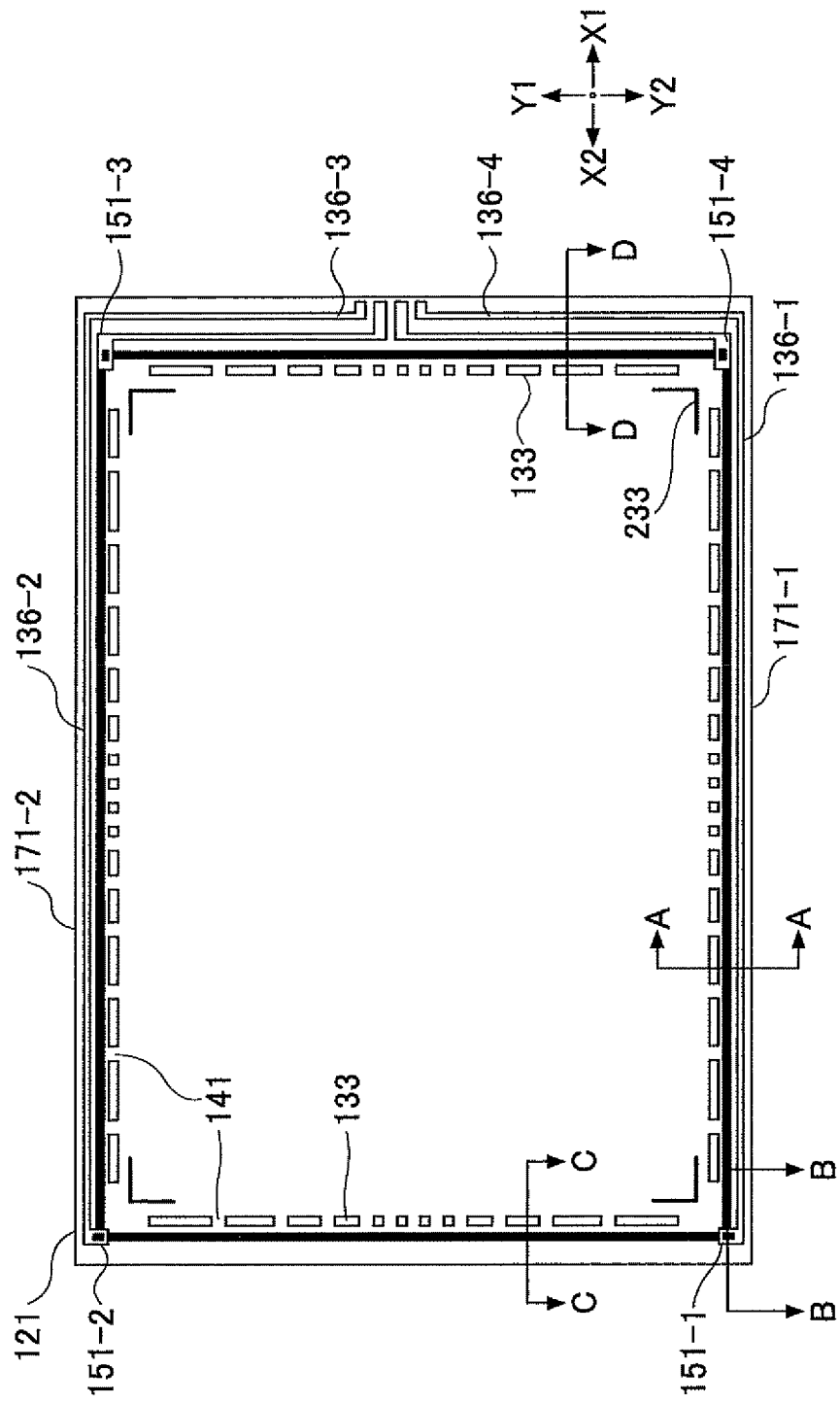
FIGS. 9A to 9E are configuration diagrams of the panel unit of a second embodiment.
Figure 9B:
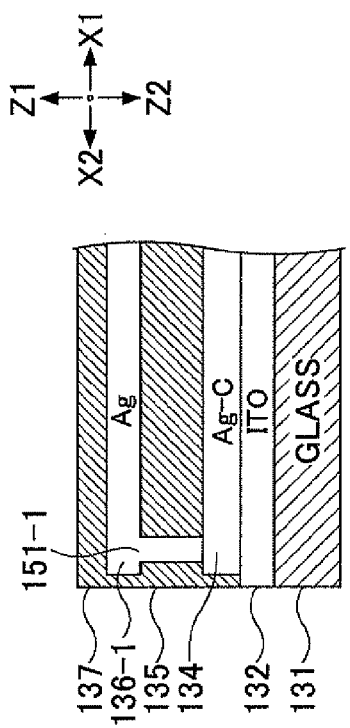
Figure 9C:
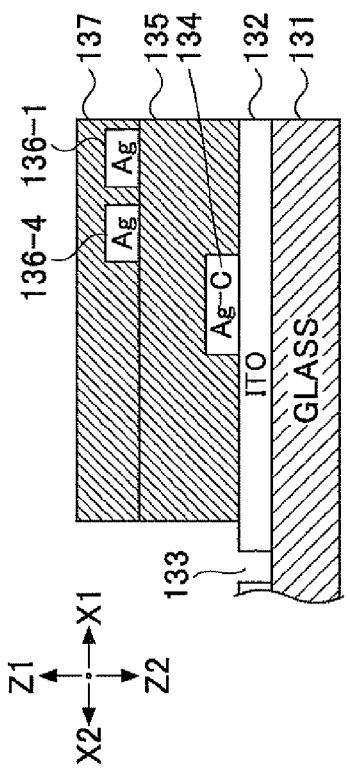
Figure 9D:
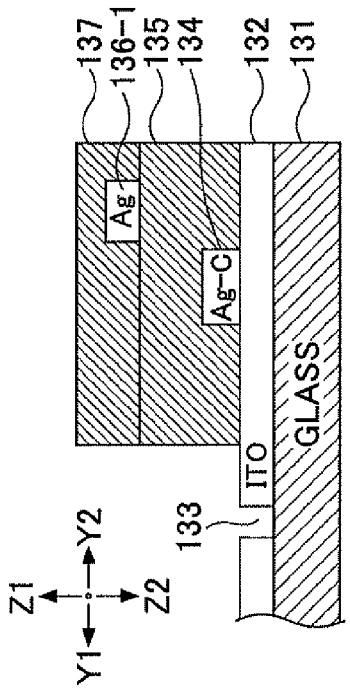
Figure 9E:
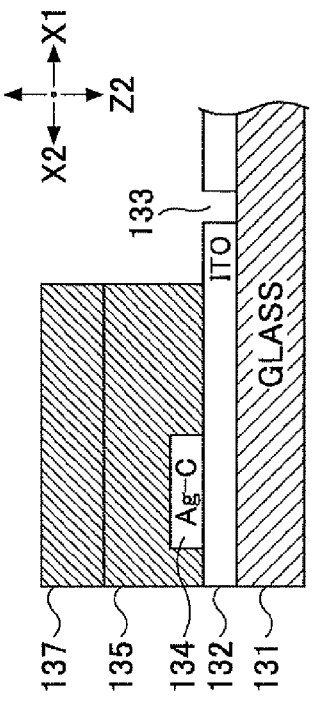

Next, a configuration of the bottom substrate 121 is described with reference to FIGS. 9A to 9E. FIG. 9A is a plan view of the bottom substrate 121, FIG. 9B is a cross-sectional view taken along a line A-A in FIG. 9A, FIG. 9C is a cross-sectional view taken along a line B-B in FIG. 9A, FIG. 9D is a cross-sectional view taken along a line C-C in FIG. 9A, and FIG. 9E is a cross sectional view taken along a line D-D in FIG. 9A.

The bottom substrate 121 is formed of the glass substrate 131, the transparent resistive film 132, the resistive film absent area 133, the common electrode 134, the first insulating film 135, the wires 136, and the second insulating film 137. The transparent resistive film 132 is formed over almost a whole surface of the glass substrate. The transparent resistive film 132 is formed of, for example, ITO (Indium Tin Oxide) by a method such as vacuum vapor deposition. The transparent resistive film 132 transmits light in a visible region of the spectrum and has a predetermined resistance.

(Resistive Film Absent Area 133)

Figure 10:
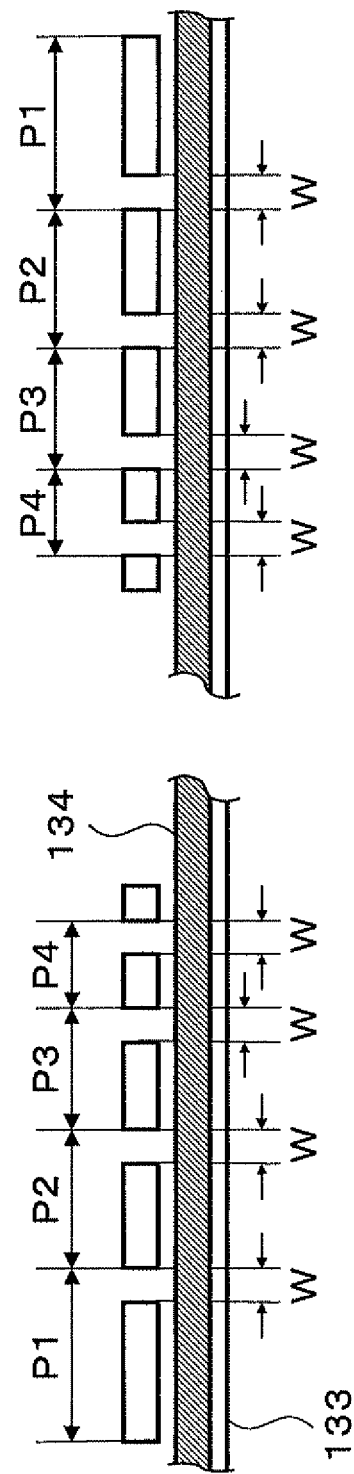
FIG. 10 is a plan view showing a substantial part of a second resistive film absent area 133.

The resistive film absent area 133 serving as a first resistive film absent area in this embodiment is formed in a peripheral edge part of the glass substrate 131 and inside, that is, on the same side of an area where the common electrode 134 is formed as a side where the center of the substrate is situated. A space between adjacent sides of the common electrode 134 and the first resistive film absent area 133 is 0 mm to 5 mm. In this embodiment, as shown in FIG. 10, spaces W between the mutually adjacent resistive film absent areas 133, that is, widths of areas for applying a potential, which are formed between the adjacent resistive film absent areas 133, are formed having the same widths as described below. In peripheries of opposite ends of the first side 171-1, the second side 171-2, the third side 171-3, and the fourth side 171-4 of the panel unit 121, the resistive film absent areas 133 are formed with wide pitches, and the pitches narrow toward a central part. Specifically, pitches P1, P2, P3, and P4, . . . of the resistive film absent areas 133 are formed to be in a relationship of P1>P2>P3>P4 . . . from the opposite ends toward the central part.

(L-Shaped Resistive Film Absent Area 233)

An L-shaped resistive film absent area 233 serving as a second resistive film absent area is formed in an L-shape at four corners of a square formed by four sides of the common electrodes 134 and inside, that is on the same side of the resistive film absent area 133 as a side where the center of the substrate is situated. A reason for forming the L-shaped resistive film absent area 233 is briefly described below with reference to FIGS. 11A to 11C.

When the L-shaped resistive film absent area 233 is not formed, only the resistive film absent area 133 is formed. In this case, the potential distribution easily becomes uneven at the four corners of the square formed by the four sides of the common electrodes 134.

Figure 11A:
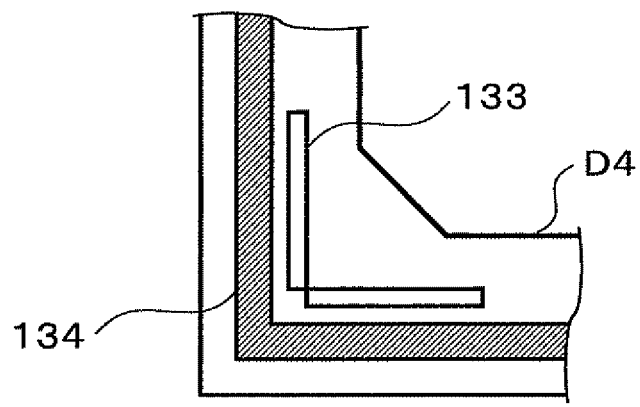
FIGS. 11A to 11C are diagrams showing the L-shaped resistive film absent area (second resistive film absent area) 233 of the second embodiment.

When the resistive film absent areas 133 contact each other at the four corners as shown in FIG. 11A, no potential is applied from the common electrode 134 at the four corners. Therefore, the potential distribution becomes as shown by a line D4, which is an uneven potential distribution in a rounded shape without corners.

Figure 11B:
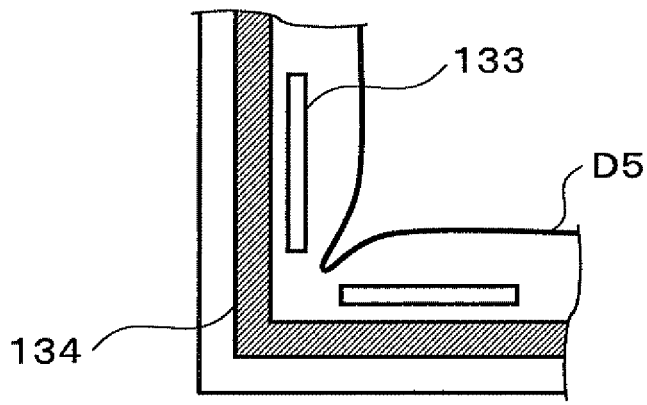

Further, when the resistive film absent areas 133 are apart from each other at the four corners as shown in FIG. 11B, a potential is applied from the common electrode 134 at the four corners. Therefore, potential distribution becomes as shown by a line D5, which is an uneven potential distribution in a shape extending to the four corners.

Figure 11C:
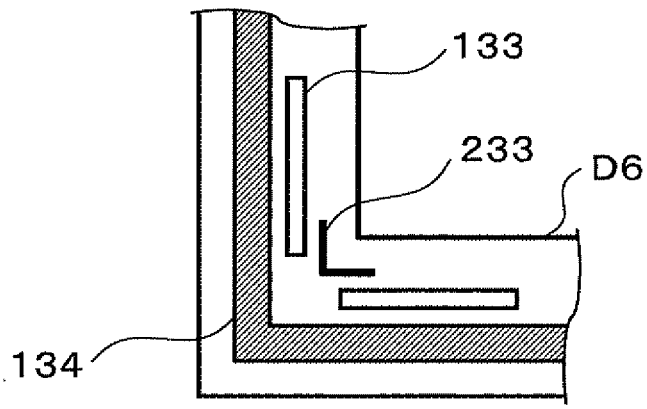
Figure 12:
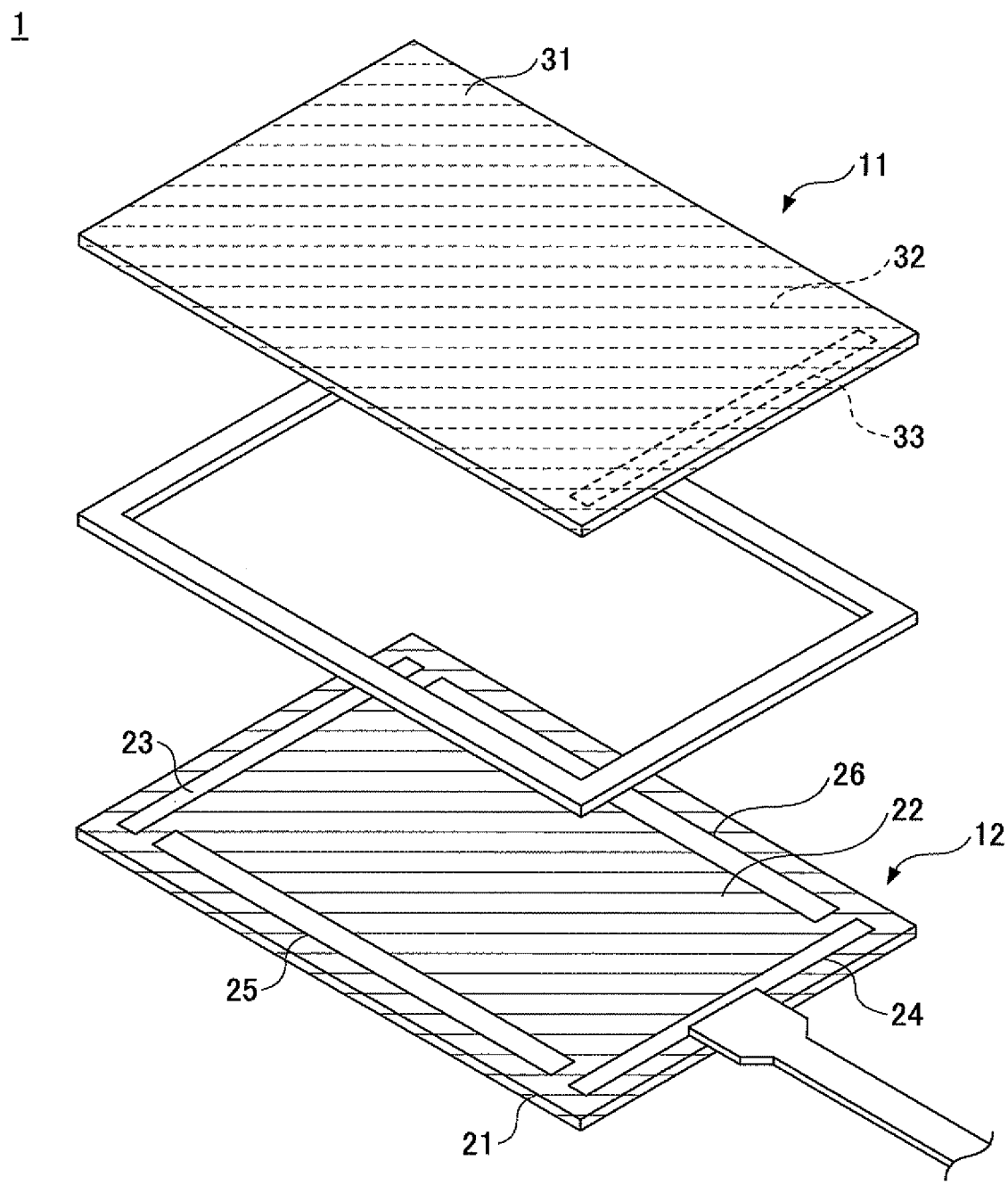
FIG. 12 is a configuration diagram of a five-line type resistive film touch panel.

In this embodiment, as shown in FIG. 11C, the resistive film absent areas 133 are formed apart from each other at the four corners and the resistive film 132, which is provided on the same side of the resistive film absent areas 133 as a side where the center of the substrate is situated, is removed in an L-shape to form the L-shaped resistive film absent area 233. As a result, the potential distribution becomes as shown by a line for which is an almost ideal even potential distribution with the remaining four corners.

The L-shaped resistive film absent area 233 as described above is formed in the bottom substrate 121 of the coordinate detecting device of this embodiment. Note that this L-shaped resistive film absent area 233 is formed at the same time as the resistive film absent areas 133, therefore, almost no additional load is generated in the manufacture process.

(Area for Applying Potential)

An area for applying a potential is an area of the transparent resistive film 132 between the mutually adjacent resistive film absent areas 133. A potential is applied to the whole transparent resistive film 132 through this area. In this embodiment, when specifically described with reference to FIG. 10, the areas for applying a potential are formed with wide pitches in the peripheries of the opposite ends of the first side 171-1, the second side 171-2, the third side 171-3, and the fourth side 171-4 of the panel unit 121, and the pitches narrow toward a central part. With such a configuration, a distortion of the potential distribution caused at the first side 171-1, the second side 171-2, the third side 171-3, and the fourth side 171-4, where the potential distribution tends to be largely distorted inwardly, can be reduced. Moreover, the potential distribution in the transparent resistive film 132 can be made even. Consequently, coordinate positions can be correctly detected.

Note that a shape of the resistive film absent area 133 is not limited to the shape shown in FIG. 10. The resistive film absent area 133 may be in any shape as long as the potential distribution of the transparent resistive film 132 becomes even.

(Common Electrode 134)

The common electrode 134 is formed of, for example, Ag—C over the transparent resistive film 132 on the outer side of the resistive film absent area 133.

In this embodiment, since the common electrode 134 is not formed over the resistive film absent area 133, the L-shaped resistive film absent area 233 and the resistive film absent area 133 can be formed after the common electrode 134 is formed.

According to one embodiment, by removing a part of a transparent resistive film connected to a common electrode, a potential apply part for applying a potential to the transparent resistive film can be formed or distribution of the applied potential can be changed. Consequently, the potential distribution over the transparent resistive film can be set evenly. Further, detection precision of coordinate positions can be improved.

Although the invention has been described with respect to specific embodiments for a complete and clear disclosure, the present invention is not limited to the above-described embodiments and variations and modifications may be made without departing from the scope of the invention.

The present application is based on and claims the benefit of priority of Japanese Patent Application No. 2008-128141, filed on May 15, 2008, the entire contents of which are hereby incorporated by reference.

What is claimed is:

1. A coordinate detecting device comprising:
a substrate formed of an insulator;
a resistive film formed over the substrate; and
a common electrode formed along four sides of the substrate over the resistive film for applying a voltage to the resistive film,
wherein the resistive film includes resistive film absent areas where the resistive film does not exist, said resistive film absent areas being arranged along the four sides of the substrate, and L-shaped resistive film absent areas formed apart from each other at each corner of the substrate,
the L-shaped resistive film absent areas are provided on the substrate more inwardly than any of the resistive film absent areas and the common electrode; and
the resistive film absent areas located along any one of the four sides are arranged so as to have pitches which become narrower toward a center part of the any one of the four side of the substrate.

2. The coordinate detecting device as claimed in claim 1, wherein an insulating film having a contact hole at a position corresponding to a predetermined area of the common electrode is formed on the common electrode; and a conductive material is provided in the contact hole, to form a driving voltage applying unit for applying a voltage to the resistive film through the common electrode.

3. The coordinate detecting device as claimed in claim 1, wherein the resistive film is formed of a material that is transparent in a visible region of spectrum; and the L-shaped resistive film absent area is formed by irradiating the resistive film with a laser light having a light emission wavelength of an infrared region or an ultraviolet region.

4. The coordinate detecting device as claimed in claim 1, further comprising a wire stacked over the common electrode with an interlayer insulating film interposed therebetween.

5. The coordinate detecting device as claimed in claim 1, further comprising a resistive type coordinate positioning unit for detecting a coordinate position.

6. The coordinate detecting device as claimed in claim 1, further comprising an electrostatic capacitor type coordinate positioning unit for detecting a coordinate position.

7. The coordinate detecting device as claimed in claim 1, wherein each of the resistive film absent areas is formed so that only outer periphery portion of the resistive film of each of the resistive film absent areas is removed while the resistive film surrounded by the outer periphery portion remains.

8. A coordinate detecting device comprising:
a substrate formed of an insulator;
a resistive film formed over the substrate; and
a common electrode formed along four sides of the substrate for applying a voltage to the resistive film,
wherein the resistive film includes a first resistive film absent area where the resistive film does not exist, said first resistive film absent area being arranged along the four sides of the substrate;
a space between adjacent sides of the common electrode and the first resistive film absent area is 0 mm to 5 mm; and
the resistive film further includes an L-shaped second resistive film absent areas formed apart from each other at each corner of the substrate;
the L-shaped resistive film absent area is provided on the substrate more inwardly than any one of the first resistive film absent area and the common electrode; and
the first resistive film absent areas located along any one of the four sides are arranged so as to have pitches which become narrower toward a center part of the any one of the four side of the substrate.

9. A coordinate detecting device comprising:
a substrate formed of an insulator;
a resistive film formed over the substrate; and
a plurality of common electrodes, each of the plurality of common electrodes being formed along one of four sides of the substrate over the resistive film for applying a voltage to the resistive film,
wherein the resistive film includes resistive film absent areas where the resistive film does not exist, said resistive film absent areas being arranged along the four sides of the substrate, and L-shaped resistive film absent areas formed at each corner of the substrate, and
the L-shaped resistive film absent areas are provided on the substrate more inwardly than any of the resistive film absent areas and the common electrode.

10. The coordinate detecting device according to claim 9, wherein each of the resistive film absent areas is formed along sides of a rectangular area, and resistive film outside the resistive film absent area and resistive film remaining inside the resistive film absent area are electrically insulated from each other.

11. The coordinate detecting device according to claim 9, wherein
the resistive film absent areas are formed within an area surrounded by the common electrodes.

\* \* \* \* \*